Figure 1:
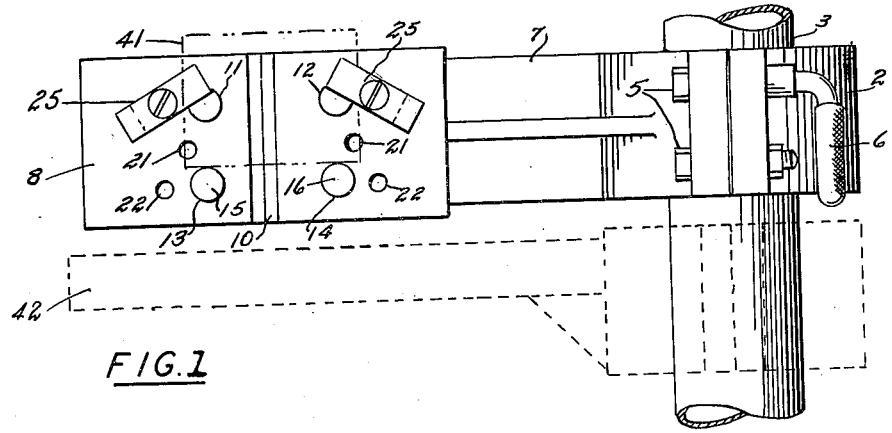

June 13, 1950  F. L. KEITH  2,511,345
WORK HOLDING FIXTURE
Filed July 30, 1945

INVENTOR.
Franklin Leo Keith
BY Scott L. Norvell
Attorney.

Patented June 13, 1950

2,511,345

UNITED STATES PATENT OFFICE 2,511,345

WORK HOLDING FIXTURE

Franklin Leo Keith, Phoenix, Ariz.

Application July 30, 1945, Serial No. 607,839

4 Claims. (Cl. 77—63)

This invention relates to work holding fixtures for drill presses.

Heretofore, drill presses have been provided, conventionally, with a table, on which work to be drilled was placed and held. The table is usually pivotally attached to the drill frame column and is provided with means for vertical adjustment. The work was usually held by one hand on the table and the drill fed by manual adjustment by the other. The structure of drills is such that as the drill breaks through the bottom of the work, it is apt to jam and bind in the work, and then break away from the hand of the operator either damaging him, bending the drill, or, at least, requiring the drill to be stopped while the work is again grasped and reset on the table. Further, drill chips collecting on the top of the table are always an annoyance and must be removed so that the work may be held flat on the table. It is also known that work cannot be accurately positioned by hand and held sufficiently steady for accurate drilling, particularly when held at an angle.

To overcome some of these difficulties, various vises and jigs have been developed to hold work on the drill table. These are, in some instances, securely attached to the table, and in other instances simply rest on the table. In all cases, however, the table is still used.

The device hereinafter disclosed is adapted, primarily, to take the place of the table and hold work independently of it. However, it can be used as a safety plate to protect the operator from jammed work pieces when used with a table.

In practice, I have found that the drilling of work pieces on a horizontal table is more a custom than a necessity or convenience. Work can be better held on horizontal parallels, and braced against a vertical plate than on a horizontal table. If held manually, the danger of injury from a jammed drill is eliminated. If it must be clamped, a vertical plate, used in connection with horizontal parallels is readily adaptable. The round horizontal parallels, hereafter described, shed chips and do not have to be cleaned to secure accurate bedding of the work piece. Moreover, when the work is clamped, it is easier to provide clamping means against the vertical plate than upon a horizontal plate. Holding edged plates for angular drilling is particularly expedited.

In view of the foregoing, this invention has for its objects, first, the provision of a work holder and safety plate which is to be used in place of the usual drill table to hold work in various positions and at various angles, as desired, for drilling;

A second object is to provide a work holder for drill presses having an arm with parallel vertical faces provided with detachable horizontal parallels;

A third object is to provide a work-holding arm having parallel vertical work faces with means for attaching work clamps thereon, and adapted to receive horizontal parallel bars with a conventional table to provide a safety plate.

Other objects will appear hereinafter.

Figure 2:
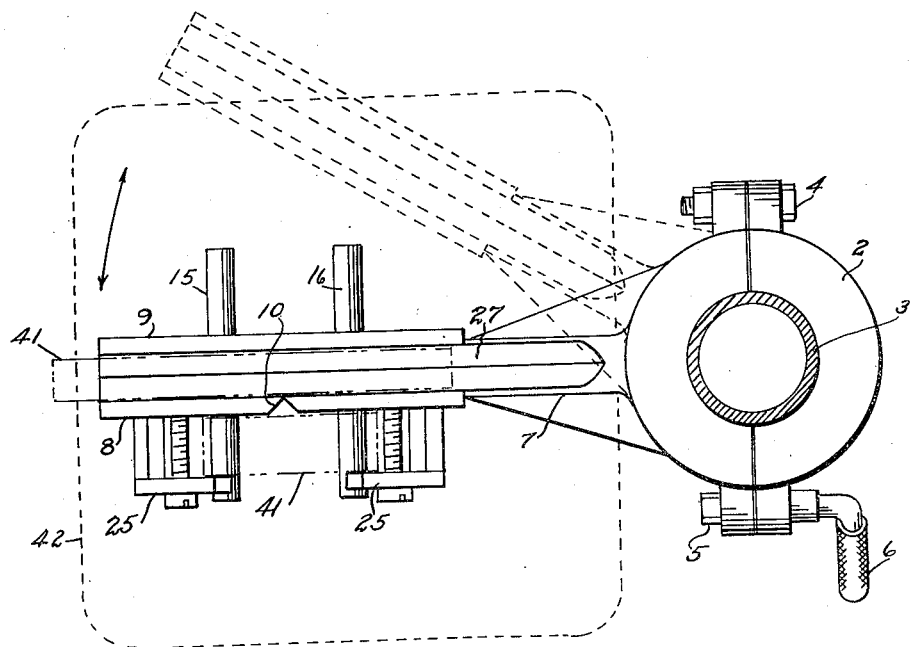

I attain the foregoing objects by means of the devices and construction shown in the accompanying drawings in which:

Figure 1 is a side elevation of my safety drilling arm with parallels in place; and Figure 2, a plan view thereof.

Similar numerals refer to similar parts in the several views.

The split collar 2 attaches to the drill frame column 3 by pairs of clamping bolts 4 and 5. The upper bolt nut of the latter pair is provided with the hand lever 6 which provides a means for quick setting and locking of the collar on the column. Extending radially from the collar is an arm 7. The outer portion of this arm has a greater width and depth than the inner portion. The vertical faces of this portion are machined and finished to afford two parallel work faces 8 and 9 parallel with the axis of the spindle shaft of the drill on which the device is to be used.

Face 8, being the right-hand face in this instance, is provided with a vertical V groove 10. The bottom of this groove is alined vertically with the drill spindle, and is formed and positioned radially so that round work of a predetermined size, say one inch in diameter, when clamped in the notch will be axially alined with the spindle when the arm is swung under it. It may then be center drilled. Round work pieces of smaller diameter may be held in thimbles of one inch outside diameter, or split collars clamped in the notch in a manner well known to the art.

Equidistantly on each side of the V notch are four holes 11 and 12, near the top edge, and 13 and 14, near the bottom, bored horizontally through the arm and adapted to receive round, parallel bars 15 and 16. These bars may be termed "parallels" and used as a base for holding work.

Other pairs of symmetrically arranged threaded holes 20, 21 and 22 are positioned on each side of the V groove 10, and adapted to receive clamping screws for finger clamps such as indicated by numerals 25.

A V groove 27 is machined on the top face 28 of the arm to hold round work pieces horizontally for diametrical drilling. Center end drilling of round work is accomplished by clamping or holding the work in vertical groove 10, as above explained.

In use, this workholding arm can be used to hold work pieces (indicated in dotted outlines 41) either on the arm, on the parallels, or on a table 42, also shown in dotted outline. In the latter case, the face of the arm 7 becomes a safety rest.

While parallels 15 and 16 are here shown as round bars, it is conceivable that triangular bars with one edge at the top, or square bars, similarly positioned, may be used. Drill chips do not collect on the bedding faces of bars shaped and positioned in this manner.

Since the device is subject to wide variation as to form, I do not wish to be limited by the exact exemplary form shown, but by the following claims.

I claim:

1. A work holding fixture for drill presses having a vertical frame column and drill spindle, a radially extending arm clampably attachable to the frame column of said drill press, a rectangular outer portion of said arm having parallel vertical work faces, pairs of holes transversely extending through said outer portion, adapted to receive work holding parallels, round bars, forming work holding parallels, fitted into said transverse holes, and means for clamping work pieces resting on said parallels to one of the vertical faces of said arm.

2. A work holding fixture for drill presses having a vertical frame column and drill spindle, radially extending arm clampably attachable to the frame column of said drill press, a rectangular outer portion of said arm having parallel vertical work faces and a flat top having a longitudinal V groove, pairs of holes transversely extending through said outer portion, and bars forming parallels fitted into said holes, a plurality of threaded holes extending transversely thru the outer faced portion of said arm, clamping screws operative therein, and finger clamps operatively engaged by said screws and adapted to clamp work pieces against either one of the vertical work faces of said arm.

3. A work holding fixture for drill presses having a vertical frame column and a vertical spindle, comprising a radially extending arm clampably attached to said frame column; vertical work faces, parallel with the axis of said spindle and the radial plane of said arm formed on the outer portion of said arm; round bars forming parallels adapted to support work extending transversely through the said outer portion of said arm; and work holding clamps supported on screws threaded into said outer faced portion of said arm.

4. In a drill press having a frame including a vertical column and a vertical spindle, the combination therewith of, a radially extending arm clampably attached to said column and having parallel vertically disposed work faces lying in planes parallel to the radially projected center of said arm, on its outer portion, work supporting parallels transversely extending through the faced outer portion of said arm, said arm having threaded holes extending through the said outer portion thereof adapted to receive clamping screws, and clamping screws threaded into said holes supporting clamping plates adapted to secure work resting on said parallels.

FRANKLIN LEO KEITH.

REFERENCES CITED

The following references are of record in the file of this patent:

UNITED STATES PATENTS

| Number | Name | Date |
| --- | --- | --- |
| 146,064 | Hahn | Dec. 30, 1873 |
| 575,538 | Williamson | Jan. 19, 1897 |
| 634,324 | Canedy | Oct. 3, 1899 |
| 800,685 | Scoggins | Oct. 3, 1905 |
| 893,875 | Schneider | July 21, 1908 |
| 910,920 | Harbert | Jan. 28, 1909 |
| 927,493 | Crouse | July 13, 1909 |
| 933,799 | Van Huffel | Sept. 14, 1909 |
| 935,470 | Davis | Sept. 28, 1909 |
| 1,079,143 | Pool | Nov. 18, 1913 |
| 1,155,222 | Dorothy | Sept. 28, 1915 |
| 1,341,841 | Cocks | June 1, 1920 |
| 1,452,506 | Hervig | Apr. 24, 1923 |
| 1,506,641 | Hunke et al. | Aug. 26, 1924 |
| 1,529,557 | Simon | Mar. 10, 1925 |
| 1,551,995 | Lovenston | Sept. 1, 1925 |
| 1,630,993 | West | May 31, 1927 |
| 2,183,295 | Lopez | Dec. 12, 1939 |
| 2,214,663 | Dewey | Sept. 10, 1940 |
| 2,325,387 | Fredrickson | July 27, 1943 |

OTHER REFERENCES

"American Machinist," May 3, 1928; pages 733 to 735.